United States Patent [19]
Guschin et al.

[11] Patent Number: 5,482,695
[45] Date of Patent: Jan. 9, 1996

[54] CARBON COMPOSITION PRODUCTION PROCESS

[75] Inventors: Viktor A. Guschin, Iskitim; Alexandr A. Zakharov, Krasnoyarsk; Alexei I. Lyamkin, Krasnoyarsk; Anatoly M. Staver, pr. Mira, d.3, kv.14, 660087, Krasnoyarsk, all of U.S.S.R.

[73] Assignee: Anatoly Mikhailovich Staver, Krasnoyarsk, Russian Federation

[21] Appl. No.: 94,095
[22] PCT Filed: Jul. 3, 1991
[86] PCT No.: PCT/SU91/00135
  § 371 Date: Jul. 22, 1993
  § 102(e) Date: Jul. 22, 1993
[87] PCT Pub. No.: WO93/01129
  PCT Pub. Date: Jan. 21, 1993
[51] Int. Cl.$^6$ ............................................. C01B 31/06
[52] U.S. Cl. .............................. 423/446; 264/84; 117/929
[58] Field of Search ................... 423/446; 156/DIG. 68; 264/84; 117/929

[56] References Cited

U.S. PATENT DOCUMENTS

| | | | |
|---|---|---|---|
| 3,238,019 | 3/1966 | De Carli | 423/446 |
| 4,483,836 | 11/1984 | Adadurov et al. | 423/446 |
| 4,500,672 | 2/1985 | Suzuki et al. | 423/449.1 |
| 4,552,742 | 11/1985 | Mayer | 423/446 |
| 5,087,435 | 2/1992 | Potter et al. | 423/446 |

FOREIGN PATENT DOCUMENTS

| | | | |
|---|---|---|---|
| 44438 | 11/1972 | Japan | 423/446 |
| 902364 | 12/1982 | U.S.S.R. | |
| 1077469 | 7/1967 | United Kingdom . | |
| 1115648 | 5/1968 | United Kingdom . | |
| 1138410 | 1/1969 | United Kingdom . | |

OTHER PUBLICATIONS

International Search Report PCT/SU91/00135 w/English translation.

*Primary Examiner*—Michael Lewis
*Assistant Examiner*—Stuart L. Hendrickson
*Attorney, Agent, or Firm*—Collard & Roe

[57] ABSTRACT

The present invention relates to production of superhard materials.

A carbon composition contains 18–38 wt. % of diamond having particle size of 40–120 Å and graphite to make up 100 wt. % having particle size of 200–1000 Å.

A process for producing the carbon composition consists in detonating a carbon-containing explosive having a negative oxygen balance, in a cooling medium containing 40–60 vol. % of carbon dioxide gas, not more than 2 vol. % of free oxygen, and a neutral gas to make up 100 vol. %.

The present carbon composition will find predominant application as an abrasive for superfinish polishing.

3 Claims, No Drawings

CARBON COMPOSITION PRODUCTION PROCESS

TECHNICAL FIELD

This invention relates in general to production of superhard materials, and more specifically it concerns a carbon composition and a process for production thereof.

BACKGROUND ART

A vigorous development of nanotechnology in the recent period contributed to the creation of a new class of ultradisperse materials produced by high-energy processes.

One prior-art process is in current use for producing a carbon composition for subsequent isolation of diamonds therefrom by detonation of a carbon-containing explosive featuring a negative oxygen balance, in a neutral-gas cooling medium (cf. Nature, v. 333, 1988, June, "Diamonds in detonation soot" by N. Roy Greiner et al, pp. 440–443.

The resultant carbon composition contains diamond and graphite, both having a particle size of from 40 to 60 Å. The diamond modification is isolated from the composition by virtue of oxidation of the graphite modification.

However, it is due to a little difference in size between the diamond and graphite modifications that such a composition cannot be used for superfinishing the surface of superhard materials owing to its being devoid of damping properties.

Known in the art is a process for producing a carbon composition containing up to 50 wt. % of the diamond phase having a particle size up to 1 μm, by detonation of a mixture of a carbon-containing explosive featuring a negative oxygen balance, graphite, and soot in a neutral-gas cooling medium (PCT/SU 82/00458).

The effect of a detonation wave provides for conditions of a thermodynamic stability of the diamond phase, whereby part of the graphite phase turns into the diamond modification which is then extracted from the resultant carbon composition, containing the diamond phase and the residual graphite. The thus-produced diamond modification can be used as polishing powders.

However, due to its low dispersity the carbon composition produced according to the process discussed above, features high abrasiveness of a nontribomechanical nature when applied for surface finish, which results in formation of relief and disturbed layers. That is why said composition cannot be used for superfinishing the surface of hard materials nor can it be employed as an antifriction additive.

DISCLOSURE OF THE INVENTION

The present invention has for its principal object to provide a carbon composition by selecting a proper ratio between the diamond and graphite modifications thereof featuring high dispersity, which composition is capable of providing a tribomechanical nature of its effect when applied for machining hard surfaces and has high damping properties, as well as to develop a process for producing such a carbon composition due to selecting an appropriate formulation of a cooling medium which ensures high dispersity and the required ratio between the carbon components of the proposed composition.

The foregoing object is accomplished due to the fact that in a carbon composition, containing diamonds and graphite, according to the invention, the diamond particles are 40–120 Å in size, while the graphite particles, 200–1000 Å, the ratio between the components being as follows (wt. %):

| | |
|---|---|
| diamond | 18–38 |
| graphite | to make up 100. |

The herein-proposed carbon composition consists of ultradisperse components possessing tribomechanical nature of interaction with the surface being machined, which provides for removal of the material being polished without any mechanical disturbances of the surface involved. The carbon composition, according to the invention, has elastic properties due to its containing two carbon modifications, a diamond and a graphite, which are characterized by different grain microhardness, whereby abrasive treatment of hard materials can be performed to attain high quality of surface finish. The principal abrasive effect is exerted by the diamond modification, whereas the graphite modification serves as a damping layer preventing high impact load on the diamond modification that might cause charging of the surface being machined with abrasive matter, thus inflicting deep local damages which deteriorate the quality of superfinish of the surface involved. When the carbon composition is moved over the surface being machined the diamond grains get embedded in the superficial layer consisting of larger graphite grains to establish a soft bonded abrasive having high elastic and heat-conducting properties. This reduces the temperature at the point of abrasive contact and rules out a possibility of burning the surface being machined, that is, of inflicting thermal flaws.

The carbon composition featuring the content of the diamond modification imparting said properties thereto, ranging from 18 to 38 wt. %. The diamond content above 38 wt. % results in disturbed damping properties of the composition and in surface flaws that affect adversely the quality of the surface being machined, whereas the diamond content below 18 wt. % results in that the carbon composition becomes incapable of removing the material being machined apparently due to complete embedding of the diamond modification in the graphite one during the machining process, which manifests itself as glazing of the polishing abrasive grains by the graphite modification.

The ratio between said particle sizes of the diamond and graphite modifications enables one to attain not only high rate of removal of the material being machined but also high quality of surface finish featuring surface profile irregularities at a level of few nanometers. Reduction of the diamond particle size below 40 Å results in discontinuance of the surface polishing process performed by the carbon composition due to restrictions inherent in the tribomechanical nature of abrasive interaction, when particle weight is insufficient to provide an activated center responsible for removal of the material being machined. Diamond-modification particle size increased above 120 Å results in a changed character of interaction from the tribomechanical to abrasive-impact one which in turn impairs the quality of the machined surface finish.

The particle size of the graphite modification is selected so as to realize the damping and heat-conducting properties of the carbon composition proposed herein. With the graphite fraction particle size above 1000 Å removal of the material being machined ceases due to violation of the preselected ratio between the particle sizes of the graphite and diamond modifications. As a result, the polishing base slides, together with the surface being machined, over the graphite grains without abrasive action of the diamond modification, whereby removal of the material from the surface being machined discontinues. When the particle size of the graphite modification is below 200 Å, this deteriorates the quality of surface finish due to reduced damping properties of the elastic component of the carbon composition, that is, the graphite modification. As a result, there are observed surface flaws of the material being machined appearing as sheeny or burnt spots which owe their origin to the burning phenomena arising at the points of local contact between the carbon composition and the surface being machined.

Elastic properties of the carbon composition, ultrahigh dispersity of its components, as well as their chemical stability render said composition applicable as friction modifiers in magnetic and lubricating compositions and as color pigments in varnishes, lacquers and paints.

The foregoing object is accomplished also due to the fact that in a process for producing a carbon composition by detonating a carbon-containing explosive featuring a negative oxygen balance, in a neutral gas-containing cooling medium, according to the invention, detonation is carried out in a cooling medium, containing also carbon dioxide gas in an amount of 40–60 vol. % with its free oxygen content not exceeding 2% of the amount of the cooling medium.

The proposed process is capable, due to the use of a cooling medium of the aforementioned composition, of controlling the amount of the diamond modification thus formed and ensuring the required ultrahigh dispersity of the diamond and graphite particles.

Under the action of high pressures and temperatures occurring in the detonation front the molecules of the carbon-containing raw stock are decomposed to evolve free carbon to which migration to the diamond modification is thermodynamically more advantageous. After synthesis the detonation products are cooled in two stages, the diamond modification remaining unaffected, that is, due to adiabatic expansion and heat-and-mass exchange with the cooling medium. As the control of the cooling process at the first stage is a complicated task, it is simpler, from engineering viewpoint, to effect this at the second stage by appropriately selecting the components of the cooling medium. It has been established that the most suitable gas to be used in the cooling medium is $CO_2$, inasmuch as it features an adequately high heat capacity and density and is the main component of the gaseous detonation products. It is due to changing the $CO_2$ content of the cooling atmosphere that the amount of the preserved diamonds can be regulated, since the cooling rate influences the graphitization process, that is, the greater the amount of $CO_2$ the higher the diamond content of the carbon composition. It has been found that when the $CO_2$ content of the cooling medium is below 40 vol. % the diamond modification content of the carbon composition falls below 18 wt. %, whereas the $CO_2$ content above 60 vol. % increases the diamond content of the carbon composition above 38 wt. %.

Use of the cooling medium, according to the invention, containing also a neutral gas in an amount of 40–60 vol. % makes it possible to maintain a required pressure in the explosion chamber at a level of 1 atm. It is expedient that used as a neutral gas be argon or nitrogen, both of which do not react with carbon under conditions of sympathetic detonation. Gases making part of the cooling medium do not participate in detonation synthesis and exert influence only on the second cooling stage. Free oxygen content of the carbon dioxide gas is not to exceed two percent of the volume of the cooling medium, otherwise oxygen may oxidize the carbon products of the synthesis and thus upset the ratio between the graphite and diamond modifications of the carbon composition, according to the invention.

In order to optimize the detonation process contributing to attaining the required ultrahigh dispersity of the diamond and graphite modifications, it is expedient that used as a carbon-containing explosive be a mixture of trinitrotoluene (TNT) and cyclotrimethylenetrinitramine (RDX) taken in a weight percent ration of 40–60:60–40.

BEST METHOD OF CARRYING OUT THE INVENTION

There is prepared a charge of a carbon-containing explosive weighing 650 g with a density of 1.65 g/cm³. The explosive contains 40 wt. % of TNT and 60 wt. % of RDX. The charge of the explosive is placed in an explosion chamber having a volume of 2.14 m³ and the chamber is filled with a cooling medium consisting of 60 vol. % $CO_2$ and 40 vol. % $N_2$, the cooling atmosphere being completely free of free oxygen. A pressure of 1 atm is maintained in the explosion chamber. Then detonation of the charge of the carbon-containing explosive is effected in the explosion chamber, with the result that the explosive decomposes under the action of high temperature and pressure in the detonation front, whereby 90 g of the carbon composition is isolated, containing 38 wt. % of diamond and 62 wt. % of graphite. The diamond particle size ranges from 40 to 120 Å, that of graphite, from 200 to 1000 Å. Abrasiveness of the resultant carbon composition is determined according to the generally adopted procedures in terms of machining a high hard alloy. The quality of surface finish is evaluated by the light technique under a microscope through measuring the amount of surface roughness with a laser profilometer Supertex with an accuracy of roughness value of 0.5 μm, the spot size being 5 μm.

The resultant carbon composition is characterized by the following abrasive characteristics:

| | |
|---|---|
| material removal rate, μm/h | 3.8 |
| roughness value, Å | 50 |
| surface flaws | none. |

Tabulated hereinbelow are other exemplary embodiments of the proposed invention with reference to characteristics of carbon-containing explosives (CCE), cooling medium components, carbon composition ingredients, and abrasive characteristics of the latter.

TABLE 1

| Nos of examples 1 | CCE composition, wt. % 2 | CCE density, g/cm³ 3 | Weight of CCE charge, g 4 | Cooling medium composition, vol. % | | | Weight of carbon composition, g 8 |
|---|---|---|---|---|---|---|---|
| | | | | CO₂ 5 | inert gas 6 | free O₂ 7 | |
| 1 | Mixture of TNT and RDX (40:60) | 1.65 | 650 | 50 | nitrogen 49 | 1 | 86 |
| 2 | Mixture of TNT and RDX (40:60) | 1.65 | 650 | 40 | argon 60 | — | 78 |
| 3 | Same | 1.65 | 650 | 60 | nitrogen 39 | 1 | 76 |
| 4 | Mixture of TNT and RDX (50:50) | 1.61 | 600 | 50 | nitrogen 48 | 2 | 84 |
| 5 | TNT | 1.55 | 650 | 50 | nitrogen 50 | — | 34 |

| | Ingredients of carbon composition wt. % | | Particle size, Å | | Abrasive characteristics of carbon composition | | |
|---|---|---|---|---|---|---|---|
| | diamond 9 | graphite 10 | diamond 11 | graphite 12 | rate of material removal, m/h 13 | roughness value, Å 14 | surface flaws 15 |
| 1 | 26 | 71 | 60–100 | 300–600 | 3.0 | 40 | none |
| 2 | 18 | 82 | 40–60 | 200–400 | 2.0 | 25 | none |
| 3 | 20 | 80 | 50–70 | 400–800 | 2.2 | 28 | none |
| 4 | 28 | 72 | 80–120 | 500–1000 | 3.2 | 42 | none |
| 5 | 20 | 80 | 48–80 | 300–600 | 2.5 | 28 | none |

EXAMPLE 6

Application of the proposed carbon composition as an antifriction additive to the composition of the working layer of a magnetic storage medium.

The working layer consisting of 30 wt. % of a magnetic iron oxide, 18.3 wt. % of an organic base, 48.7 wt. % of a vehicle, and 2.7 wt. % of a dispersant is doped with 0.3 wt. % of the proposed carbon composition. The resultant mixture is applied to a polyethyleneterephthalate base and the resultant magnetic storage medium is tested for compliance with the main parameters. The tests have demonstrated that the adhesion strength increases 2.5 times. A drop of the output signal level after 100,000 passes of the magnetic storage medium in a wear tester is reduced 30 times.

EXAMPLE 7

Application of the proposed carbon composition for pencil manufacture.

Molten destructurized low-molecular polyethylene taken in an amount of 20 wt. % is doped with 9.0 wt. % of the proposed carbon composition and 1 wt. % of vaseline oil at 120° C. The resultant mixture is forced through dies of a required size into molds and is cooled.

Inscriptions made by the pencils thus manufactured on diverse surfaces, such as glass, metal, paper are fast, nonfading, and water-indelible. Resistance to attrition wear of such inscriptions is increased 2–2.5 times.

EXAMPLE 8

Application of the proposed carbon composition as an abrasive in a multipurpose polishing suspension for superfinishing the surface of the various materials.

A water-glycerol base taken in an amount of 76.0 wt. % is doped with 7.0 wt. % of polyhydroxy-ethylated monoethanolamide of a synthetic fatty acid ($C_{10}$–$C_{20}$), 2.0 wt. % of tripolyphosphate, 8.0 wt. % of triethanolaminooleate, and 7.0 wt. % of the proposed carbon composition.

After having been subjected to dispersion the resultant polishing suspension can be used for polishing the surface of glass, silicon, or sapphire.

Profile irregularities of the polished surface equal 2–3 nm, and the subsurface layer of the material is completely free from any impairment.

EXAMPLE 9

Application of the proposed carbon composition as a pigment for letterpress and offset ink.

A mixture containing 14.8 wt. % of a vehicle, 21.5 wt. % of rosin-modified maleic resin, 10.0 wt-% of linen oil, and 1.5 wt. % of a polycondensate of phthalic anhydride and pentaerythritol is doped consecutively with 35 wt. % of polyethylene wax, 0.2 wt. % of chlorinated rubber, and 17 wt. % of the proposed carbon composition at 120° C. under constant stirring.

Given below are comparative characteristics of the printing ink obtained as described above (I) and the ink of the aforementioned formulation, using channel black as the pigment.

|  | Ink I | Ink II |
| --- | --- | --- |
| Optical density, relative units | 3.2 | 2.0 |
| Attrition resistance of a print, relative units | 0.05 | 0.25 |
| Optical density of residual print after attrition, relative units | 0.01 | 0.06 |
| Shelf life, months | 18 | 5 |

Ink I excels ink II, as to principal characteristics, by 1.6 to 6 times.

Industrial Applicability

The carbon composition proposed herein can find application for making polishing suspensions used in superfinishing the surface of the various materials, as an additive to lubricating compositions having low friction factors, as ultradisperse fillers in cutting fluids used in metal machining, and as pigments for varnishes, lacquers, and paints.

We claim:

1. A process for producing a carbon composition containing diamond and graphite, comprising diamond particles being 40–120 Å in size;

graphite particles being 200–1000 Å in size;

the ratio between both being diamond being 18%–38% by weight;

graphite being 62%– 82% by weight;

said process comprising the step of detonating a carbon-containing explosive featuring a negative oxygen balance in a cooling medium containing a neutral gas, and containing also carbon dioxide gas in an amount of 40–60% by volume, with its free oxygen content not in excess of 2% of the amount of the cooling medium.

2. A process according to claim 1, wherein said cooling medium comprises argon or nitrogen as a neutral gas.

3. A process according to claim 1, further comprising the steps of using as said carbon-containing explosive a mixture of TNT and RDX, the weight percent ratio therebetween being 40–60:60–40.

\* \* \* \* \*